United States Patent [19]

White

[11] Patent Number: 4,531,685
[45] Date of Patent: Jul. 30, 1985

[54] FILM MEDIA TAKE-UP SPINDLE WITH AUTOMATIC ENGAGEMENT PAWL

[75] Inventor: Walton L. White, Thousand Oaks, Calif.

[73] Assignee: Auto Logic, Inc., Newbury Park, Calif.

[21] Appl. No.: 474,355

[22] Filed: Mar. 11, 1983

[51] Int. Cl.³ .............................................. B65H 75/28
[52] U.S. Cl. .................................................... 242/74.1
[58] Field of Search ........................ 242/74, 74.1, 74.2, 242/195

[56] References Cited

U.S. PATENT DOCUMENTS

| | | | |
|---|---|---|---|
| 2,542,186 | 2/1951 | Fulop | 242/74.1 |
| 2,628,789 | 2/1953 | Maxwell | 242/74.1 |
| 3,797,776 | 3/1974 | Umeda et al. | 242/74.2 X |
| 4,334,750 | 6/1982 | Fichter | 242/74.2 X |
| 4,338,015 | 7/1982 | Holmes | 242/74.2 X |

FOREIGN PATENT DOCUMENTS 1272708  7/1968  Fed. Rep. of Germany ..... 242/74.1

*Primary Examiner*—John M. Jillions
*Attorney, Agent, or Firm*—William H. Maxwell

[57] ABSTRACT

An automatic take-up spindle for phototypesetter magazines, wherein the spindle body is a tube with a coextensive slot through its outside wall to receive a leader portion of film media entering therein and restricted in length by a diametrically opposite inside wall, and an anchor pawl operable in the slot between an extended position to pass the film media into and out of the spindle body and alternately actuated by the film media wrapped thereon and unwrapped therefrom to releasably grip the film media to the spindle body.

16 Claims, 6 Drawing Figures

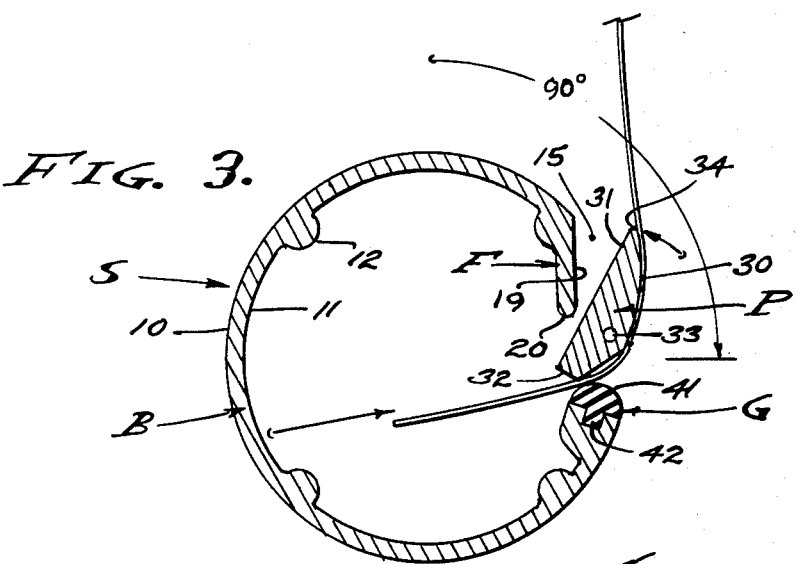
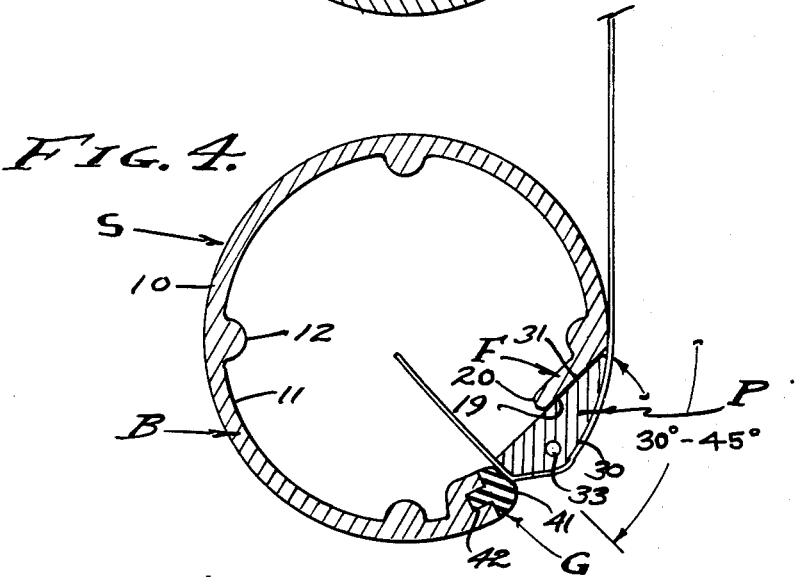
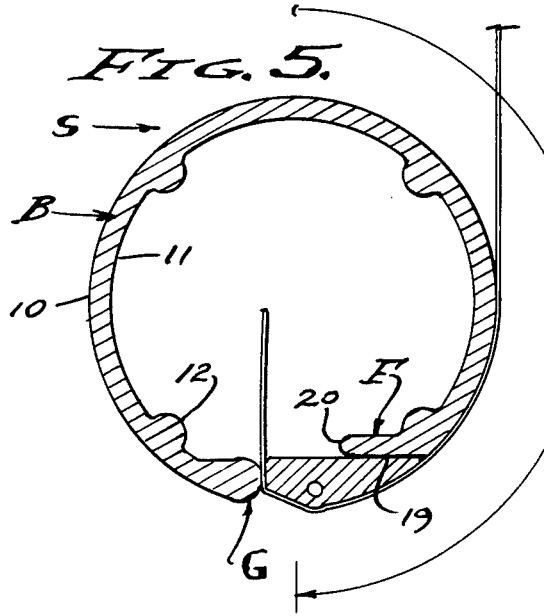
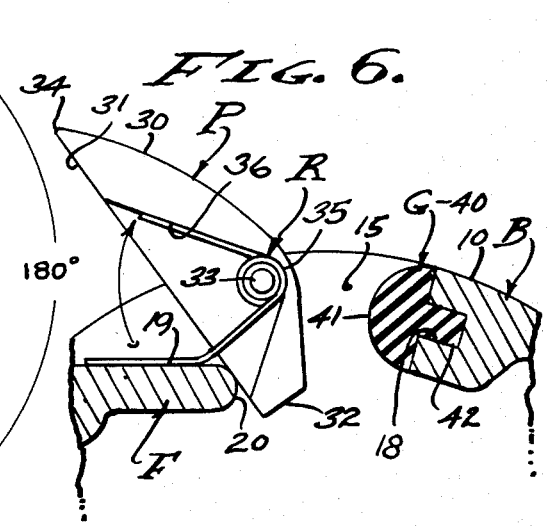

FILM MEDIA TAKE-UP SPINDLE WITH AUTOMATIC ENGAGEMENT PAWL

BACKGROUND OF THE INVENTION

This invention relates to the processing of film media in phototypesetting where large quantities of various widths of light sensitive print media is transported from a supply magazine and over a cathode ray projection system and into a take-up magazine. It is the take-up spindle with which this invention is particularly concerned, and it is film media in the form of print media or the like that varies from 75 mm to 315 mm in width, and in lengths up to 400 feet that is to be accommodated thereby. Such a take-up magazine is sizable, having a seven to eight inch substantially square cross section, and having a length to receive 315 mm wide media, for example.

Heretofore, the take-up spindle has been slotted diametrically to accept the film media leader, and of a sizable diameter of 2.44 inch and constructed of two complementary semi-circular solids of hardwood. Such a spindle requires approximately eleven inches of media wrapped around it in order to establish a secure connection, as follows: The film media is entered into the magazine and the leader thereof is inserted through a coextensive diametric slot so as to project from the opposite side a distance about equal to the spindle diameter, an end portion approximately six inches in length. The projecting end portion of the leader folds over and against the spindle as it is rotated a full turn of 360° in order to secure the connection; and all of which requires approximately eleven inches of leader wrapped around the take-up spindle. It is a general object of this invention to reduce film media leader length, since its lineal cost is great. With the present invention but three to four inches of film media is lost to the take-up spindle as a leader.

The take-up spindle of this invention has several automatic features and one of which satisfies the object of restricting leader length, as distinct from the prior art slotted spindles having no leader length control. With the present invention, the spindle is a tube slotted coextensively through one outside wall thereof for insertion of the film media leader and the length of which is restricted by engagement with the diametrically opposite and imperforate inside wall thereof. The spindle interior has a diameter substantially less than the standard exterior diameter of 2.44 inch, due to its wall thickness, and in practice limits initial leader insertion to approximately two inches. Unobviously, however, initial rotation of the spindle withdraws about half of said two inch leader and to the end that the final leader portion entering the spindle interior is only about one inch. Withdrawal of said half portion is inherent in lost motion as and when an anchor means is operated through initial turning of the spindle.

The spindle of this invention has another automatic feature and the object of which is to provide inherent operation of the said releasable anchor means, responsive to the presence of film media inserted into the slot and to the rotation of the spindle a part turn of 90° to 180° (compare FIGS. 1 and 5). With this invention there is an anchor pawl that snubs the media with a locking action that is releasable, and it is the media that wraps over said anchor pawl to actuate it, and conversely to unwrap and expose it for release. In practice, 30° or slightly more and up to 45° of the spindle rotation determines the functional effect of said anchor pawl (see FIG. 4). Consequently, only two inches, more or less, of leader is sacrificed in order to reliably secure the film media to the take-up spindle.

It is an object of this invention to provide an improved take-up spindle of the type under consideration, and which can be manufactured at reduced cost. The prior art hardwood spindles of slotted configuration have cost approximately a third more to manufacture than the improved spindle herein disclosed. With the present invention, the spindle tube is extruded of aluminum, or molded of like material having the required longitudinal features and so that machining or finishing is confined to the ends thereof. Another object of this invention is to retain the inertial characteristics of such spindles as they have been used, so that its use in motor driven phototypesetters is not adversely affected. Further, it is an object of this invention to provide a take-up spindle as thus far described that operates inherently without difficulty and with no requirement for special training or instruction to the operators of the phototypesetter equipment.

SUMMARY OF THE INVENTION

State of the art phototypesetters are loaded with film media many times during heavy peak load use. The film media is very expensive material, and especially so in large widths. Therefore, great economy can be realized in reducing leader scrap, heretofore a length of approximately eleven inches. With the present invention leader scrap is reduced to two inches or less, a saving that takes place many times during a working period. The functions of this take-up spindle are entirely automatic and provide for leader length control and for releasable anchored connection of the film media for take-up. The structure of this take-up spindle is durable and its operation reliable, while the manufacturing cost thereof is substantially reduced with respect to prior art spindles of the type under consideration.

The foregoing and various otherobjects and features of this invention will be apparent and fully understood from the following detailed description of the typical preferred form and application thereof, throughout which description reference is made to the accompanying drawings.

FIG. 3 is an enlarged sectional view of the spindle rotated 90° and showing the anchor pawl engaged by the film media and partially closed.

FIG. 4 is a view similar to FIG. 3 and shows an additional 30° to 45° rotation of the spindle and gripping of the film media.

FIG. 5 is a view similar to FIGS. 3 and 4 and shows a modified spindle body and rotation 180° from the FIG. 1 position, and FIG. 6 is an enlarged detailed fragmentary view showing the anchor pawl return means.

PREFERRED EMBODIMENT

Figure 1:
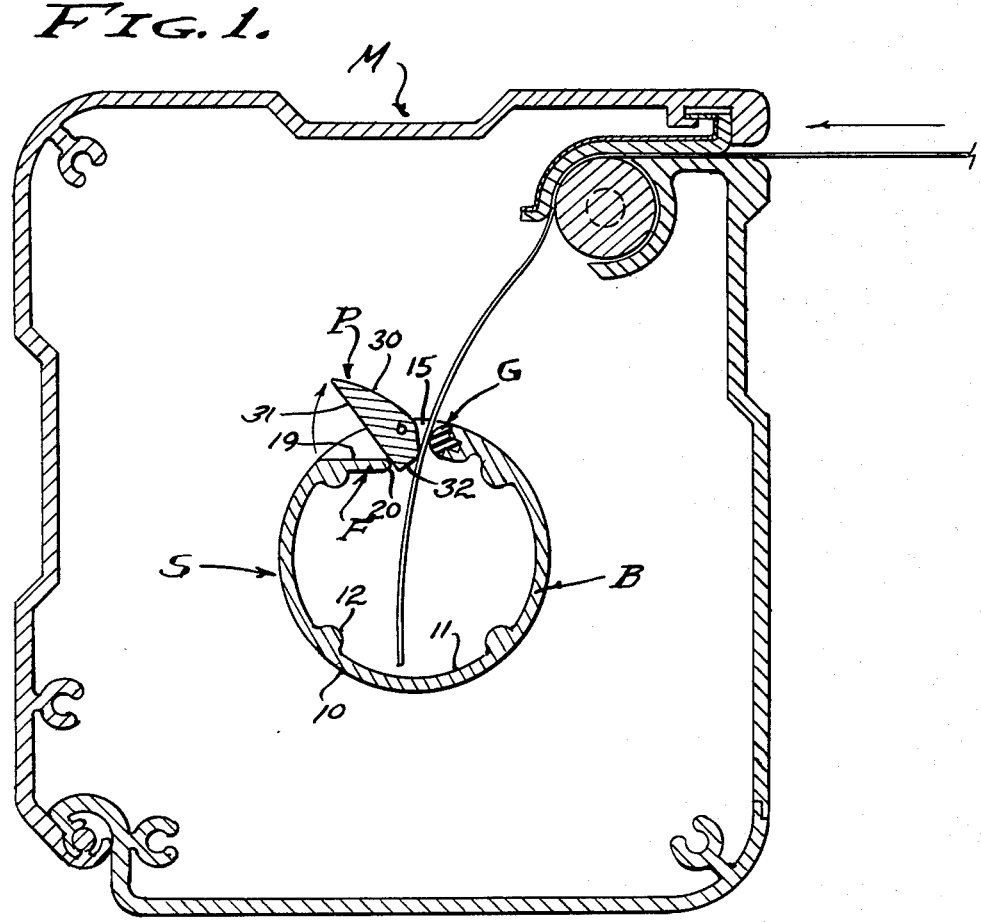
FIG. 1 is a sectional view taken through a typical take-up magazine with the take-up spindle of the present invention therein and with its slot opened and faced upwardly and a leader of film media entered therein to a limited position.
Figure 2:
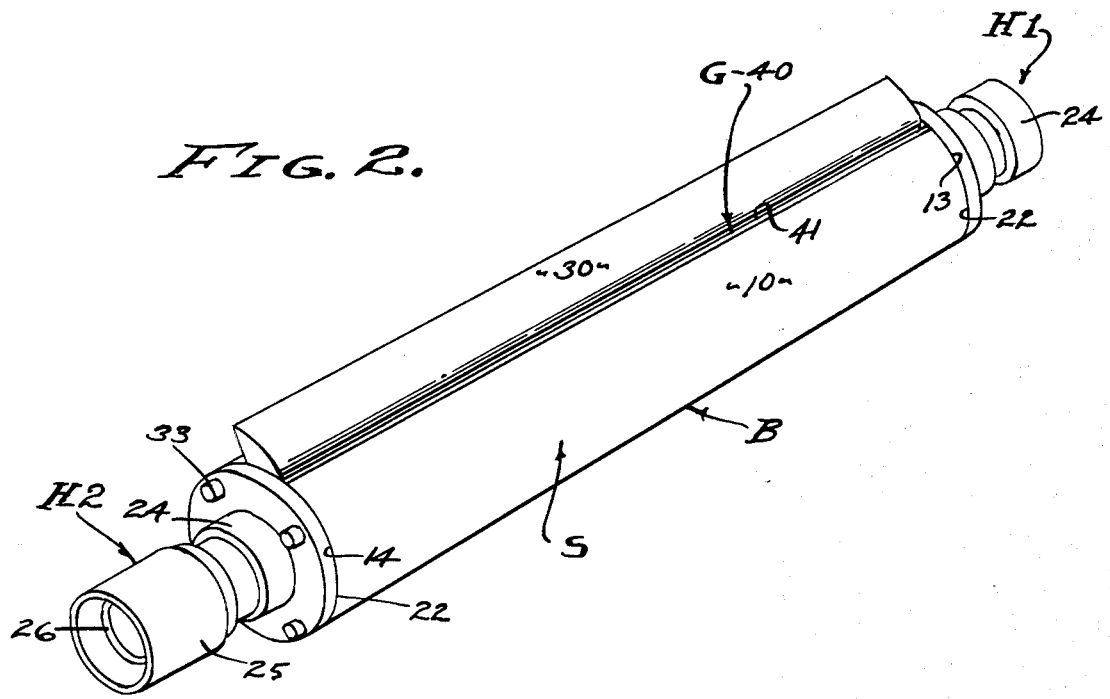
FIG. 2 is a perspective view of the spindle removed from the magazine.

Referring now to the drawings, FIG. 1 illustrates the installation of this take-up spindle S within a light tight take-up magazine M, the typical cross section of which is shown in order to indicate the direction of leader insertion dictated by the existant magazine design. It will be observed that the spindle is a slotted tube that receives a leader portion of film media, restricting the length of its insertion therein by virtue of stopped engagement thereof with the opposite inner side wall of the tube. Insertion of the film media can be diametric of the spindle tube, or as shown is somewhat diagonal so as to restrict insertion to about two inches within a spindle tube of 2.44 inch outside diameter with a 0.100 inch wall thickness. As is indicated, the film media has a degree of inward curl which is also taken into consideration in the design. In the loading condition the spindle slot is upwardly disposed, and the anchor pawl is opened outwardly and away from the spindle periphery, and which opens said slot for film media insertion and/or alternately releases the film media for withdrawal from the spindle.

The take-up spindle S as it is shown in the drawings involves generally, a body B, a supporting hub H1 and a supporting drive hub H2, an anchor pawl P, a gripper means G, and release means R. The body B is a slotted tube onto which the film media wraps, and unwraps. The hubs H1 and H2 close the opposite ends of the tubular body B and provide trunnions upon which the spindle revolves. The body B has a fixed grip bar that is opposed to the shiftable anchor pawl P, and said grip bar is preferably faced with a depressible grip means G. The anchor pawl P is biased to an open position by the release means R.

The body B is a slotted cylinder having an open interior adapted to receive a leading portion of film media in the form of relatively stiff photo sensitive paper ranging in thickness from 0.003 to 0.005 inch. As shown, the film media tends to curl downwardly and inwardly as it enters the cylinder body B, since the emulsion side is down. It is preferred that the body B is extruded aluminum having the features shown for cooperation with the anchor pawl P and for end attachment to the supporting hubs H1 and H2. In practice, the body B is a straight right cylinder having an outside wall 10 of 2.44 inch diameter, and a wall thickness of 0.100 inch. Attachment of the hubs H1 and H2 thereto is my means of internal ribs 12 that are drilled and tapped to receive screw fasteners at the opposite ends 13 and 14 which are cut off normal to the central turning axis of the spindle. The spindle body B is characterized by a slot 15 opening coextensively along the outside wall 10, and by a diametrically opposite imperforate inside wall 11.

The slot 15 is coextensive of the cylinder body B and is a film media passage provided to receive and position the anchor pawl P. In accordance with this invention, the slot 15 is defined by a gripper means G at its leading edge (the edge disposed in the direction of take-up rotation) and by a stop flange at its trailing edge, gripper means G and flange F being parallel one with the other. The gripper means G is essentially a grip bar that can be integral with the aluminum extrusion of body B as shown in FIG. 5, although it is preferred that the gripper bar per se be formed by an insert of depressible material as later described. Accordingly, the body B is formed with a circumferentially opening channel 18 opening at the leading edge to carry the grip bar of gripper means G later described. The stop flange lies in the plane of a chord that is normal to a radial line drawn from the center axis and bisecting the slot 15 opening. The outer stop face 19 of the flange is spaced radially inward from the periphery of the cylinder body outside wall 10, and its edge 20 is well spaced from the leading edge and grip bar (means G) in order to freely pass the leading portion of the inserted film media.

The supporting hubs H1 and H2 are like closures for the opposite open ends 13 and 14 of the body B and each of which is of plug formation with a centering boss (not shown) entering within the inside wall 11 and with a shoulder 22 secured to the body end 13 and 14 by screw fasteners 23. A tubular bearing trunnion 24 extends axially from the body B and with a retainer groove, to operate in coaxial journals of the magazine M. Additionally, the hub H2 carries a drive sleeve 25 and a coupling nut 26, to be motor driven as circumstances require. The spindle S is free to turn and to be motorized to turn on the bearing axis provided by the magazine M.

In accordance with this invention, I provide the anchor pawl P in the form of a releasable cam member that locks the film media against means G in response to said media when wrapped thereover, and alternately to release the film media when it is unwrapped therefrom. As shown throughout the drawings, the anchor pawl P is shown as and is also an elongated bar-shaped extruded section of aluminum, or of like material and formation, having a semi-circular outside wall 30 with a radius the same as and to continue from the radius of outside wall 10 of body B, and having a flat inside wall 31 to stop flat against the stop face 19 when the outside wall 30 is concentric with the outside wall 10. The leading edge of the anchor pawl P is turned inwardly so as to form a cam face 32 opposed to the gripper means G. Coaxial pivots 33 extend from opposite ends of the anchor pawl P and into the flange of the hubs H1 and H2, spaced closely to the outside wall 30 and near to the cam face 32 and remote from the trailing edge 34 thereby establishing a "first class" lever with force applied by the film media at trailing edge 34 and applied as work at the cam face 32. Thus, when the anchor pawl P is brought inward from a radially extended position as shown in FIG. 1, the cam face 32 revolves outwardly and circumferentially toward the opposing gripper means G to clamp the film media therebetween as shown in FIG. 4.

The release means R is a spring means and preferably a pair of spring coils 35 carried over the pivots 33 and each with a leg operating between a step 36 at the end of the anchor pawl P and the flange face 19, so as to lift the pawl to the receptive position shown in FIG. 1.

The gripper means G in its preferred and most efficient form is comprised of a depressible grip bar 40 of rubber or the like, having a round leading edge nose 41 and a mounting tongue 42 carried in the circumferentially open channel 18 so as to face circumferentially. The grip bar 40 is engaged and slightly depressed by the anchor pawl cam face 32 with the film media clamped therebetween and locked to the take-up spindle for winding thereon. Alternately, the film media is unwound from the take-up spindle S and unwrapped from the anchor pawl P, whereupon the pressure upon cam face 32 is released and the inserted leader portion freed for extraction from the slot 15.

From the foregoing, it will be seen that there are at least two outstanding automatic features inherent in the take-up spindle S hereinabove disclosed. The design as it is shown in the drawings and made principally of aluminum as described, has the inertial characteristics of prior art spindles, and consequently the spindle S of the present invention is compatible with state of the art phototypesetter equipment. Insertion of a leading portion of film media through the slot 15 and into the interior of the spindle body B results in stopped engagement with the diametrically opposite inside wall 11, thereby restricting the length of insertion. The spindle is then motorized to turn in a clockwise direction of advancement as shown, whereupon there is a predictable amount of lost motion as initial rotation of the spindle S occurs and wraps the film media over the anchor pawl P, thereby operating the spindle S to grip the film media. Observe FIG. 3 as compared with FIG. 1 for the typical withdrawal of about half of the leader portion initially inserted, the leader being approximately three inches in length. Also observe FIG. 4 where a full 90° turn is made, in which case the leader is approximately three to four inches in length. It will be seen that the take-up spindle S will continuously turn, and that it will operate both forwardly and reversely as will be dictated by the phototypesetting compositions generated upon the film media in the form of gallies of typesetting. Ultimately, the film media is totally withdrawn from the take-up spindle S for processing (development), at which time the trailing edge 34 of the anchor pawl P is exposed and released so as to extend radially and open the slot 15 for release of the film media leader. Excess leader cannot be inserted, as the limit of insertion and anchored engagement with the film media is inherent upon initial rotation of the take-up spindle S, as described.

Having described only the typical preferred forms and application of my invention, I do not wish to be limited or restricted to the specific details herein set forth, but wish to reserve to myself any modifications or variations that may appear to those skilled in the art as set forth within the limits of the following claims.

I claim:

1. A film media take-up spindle for use in power driven phototypesetter magazines, and including:
    a cylinder body having outide and inside walls with an entirely open interior and having a slot opening coextensively between the ends of the cylinder body and into said interior through said outside and inside walls and with a coextensively circumferentially faced leading edge extending between the ends of the cylinder body and facing away from the direction of take-up rotation,
    a supporting hub at each end of the body for rotation of the spindle and at least one of which is a drive hub to rotate the spindle, and
    an anchor pawl extending coextensively between the ends of the cylinder body and alternately opening and closing the slot and comprising an elongated bar-shaped lever member carried on coaxial pivots between the supporting hubs and having a coextensive semi-circular outside wall to continue the cylinder form of the outside wall of the body and a coextensive cam face circumferentially faced in the direction of take-up rotation and spaced from the coaxial pivot axis to oppose the coextensive circumferentially faced leading edge of the slot when the anchor pawl closes the slot and having a trailing edge spaced from the coaxial pivot axis and engageable by the film media entered through the slot and into the body a distance limited by the inside wall of the body diametrically opposite the slot when the anchor pawl opens the slot and to rotate the anchor pawl from the opened to a closed position with the film media compressively clamped between the leading edge of the slot and circumferentially opposed cam face of the anchor pawl when the film media wraps over said pawl and onto the take-up spindle, and alternately to release the anchor pawl to the opened position when the film media unwraps from the take-up spindle.

2. The take-up spindle as set forth in claim 1, wherein the cam face of the anchor pawl is spaced closer to the coaxial pivot axis than the trailing edge of the anchor pawl, whereby lever action thereof produces increased force for gripping the film media.

3. The take-up spindle as set forth in claim 1, wherein the leading edge of the slot opening into the body interior carries gripper means is in the form of a bar of depressible material.

4. The take-up spindle as set forth in claim 1, wherein return means biases the elongated bar-shaped lever member of the anchor pawl from the closed position to the opened position.

5. The take-up spindle as set forth in claim 1, wherein return means in the form of a spring surrounding at least one of the pivots biases the elongated bar-shaped lever member of the anchor pawl from the closed position to the opened position.

6. The take-up spindle as set forth in claim 1, wherein the coextensive slot has a trailing stop face in the form of a flange, and wherein the elongated bar-shaped lever member of the anchor pawl has a complementary inside wall to engage said stop face.

7. The take-up spindle as set forth in claim 1, wherein the cam face of the anchor pawl is spaced closer to the coaxial pivot axis than the trailing edge of the anchor pawl whereby lever action thereof produces increased force for gripping the film media, and wherein the leading edge of the slot opening into the body interior carries gripper means in the form of a bar of depressible material.

8. The take-up spindle as set forth in claim 1, wherein the cam face of the anchor pawl is spaced closer to the coaxial pivot axis than the trailing edge of the anchor pawl whereby lever action thereof produces increased force for gripping the film media, and wherein return means biases the elongated bar-shaped lever member of the anchor pawl from the closed position to the opened position.

9. The take-up spindle as set forth in claim 1, wherein the cam face of the anchor pawl is spaced closer to the coaxial pivot axis than the trailing edge of the anchor pawl whereby lever action thereof produces increased force for gripping the film media, wherein the coextensive slot has a trailing stop face in the form of a flange, and wherein the elongated bar-shaped lever member of the anchor pawl has a complementary inside wall to engage against said stop face.

10. The take-up spindle as set forth in claim 1, wherein the coextensive slot has a trailing stop face, wherein the elongated bar-shaped lever member of the anchor pawl has a complementary inside wall to engage against said stop face, and wherein the leading edge of the slot opening into the body interior carries gripper means in the form of a bar of depressible material.

11. The take-up spindle as set forth in claim 1, wherein the cam face of the anchor pawl is spaced closer to the coaxial pivot than the trailing edge of the anchor pawl, wherein the leading edge of the slot opening into the body interior carries gripper means in the form of a bar of depressible material whereby lever action produces increased force against said material for gripping the film media, wherein the coextensive slot has a trailing stop face, and wherein the elongated bar-shaped lever member of the anchor pawl has a complementary inside wall to engage against said stop face.

12. The take-up spindle as set forth in claim 1, wherein the cam face of the anchor pawl is spaced closer to the coaxial pivot than the trailing edge of the anchor pawl whereby lever action thereof produces increased force for gripping the film media, wherein the coextensive slot has a trailing stop face, wherein the elongated bar-shaped lever member of the anchor pawl has a complementary inside wall to engage against said stop face, and wherein return means biases the elongated bar-shaped lever member of the anchor pawl from the closed position to the opened position.

13. The take-up spindle as set forth in claim 1, wherein the coextensive slot has a trailing stop face, wherein the elongated bar-shaped lever member of the anchor pawl has a complementary inside wall to engage against said stop face, wherein the leading edge of the slot opening into the body interior carries gripper means in the form of a bar of depressible material, and wherein return means biases the elongated bar-shaped lever member of the anchor pawl from the closed position to the opened position.

14. The take-up spindle as set forth in claim 1, wherein the cam face of the anchor pawl is spaced closer to the coaxial pivot axis than the trailing edge of the anchor pawl whereby lever action thereof produces increased force for gripping the film media, wherein the leading edge of the slot opening into the body interior carries gripper means in the form of a bar of depressible material, and wherein return means biases the elongated bar-shaped lever member of the anchor pawl from the closed position to the open position.

15. The take-up spindle as set forth in claim 1, wherein the coextensive slot has a trailing stop face, wherein the elongated bar-shaped lever member of the anchor pawl has a complementary inside wall to engage against said stop face, wherein the leading edge of the slot opening into the body interior carries gripper means in the form of a bar of depressible material, and wherein means biases the elongated bar-shaped lever member of the anchor pawl from the closed position to the open position.

16. The take-up spindle as set forth in claim 1, wherein the cam face of the anchor pawl is spaced closer to the coaxial pivot than the trailing edge of the anchor pawl, wherein the leading edge of the slot opening into the body interior carries gripper means in the form of a bar of depressible material whereby lever action produces increased force against said material for gripping the film media, wherein the coextensive slot has a trailing stop face, wherein the elongated bar-shaped lever member of the anchor pawl has a complementary inside wall to engage against said stop face, and wherein return means biases the elongated bar-shaped lever member of the anchor pawl from the closed position to the opened position.

* * * * *